United States Patent
Hahn et al.

(10) Patent No.: US 9,813,180 B2
(45) Date of Patent: Nov. 7, 2017

(54) METHOD FOR IDENTIFYING MOBILE CELL CAUSING INTERFERENCE IN WIRELESS COMMUNICATION SYSTEM AND DEVICE THEREFOR

(71) Applicant: LG ELECTRONICS INC., Seoul (KR)

(72) Inventors: Genebeck Hahn, Seoul (KR); Jaehoon Chung, Seoul (KR); Eunjong Lee, Seoul (KR); Jinmin Kim, Seoul (KR); Kukheon Choi, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/502,163

(22) PCT Filed: May 13, 2015

(86) PCT No.: PCT/KR2015/004793
§ 371 (c)(1),
(2) Date: Feb. 6, 2017

(87) PCT Pub. No.: WO2016/021816
PCT Pub. Date: Feb. 11, 2016

(65) Prior Publication Data
US 2017/0237513 A1    Aug. 17, 2017

Related U.S. Application Data

(60) Provisional application No. 62/034,159, filed on Aug. 7, 2014.

(51) Int. Cl.
*H04J 11/00* (2006.01)
*H04W 72/04* (2009.01)
(Continued)

(52) U.S. Cl.
CPC ......... *H04J 11/005* (2013.01); *H04J 11/0073* (2013.01); *H04J 11/0076* (2013.01);
(Continued)

(58) Field of Classification Search
CPC .................................................. H04W 84/005
See application file for complete search history.

(56) References Cited

U.S. PATENT DOCUMENTS

| | | | |
|---|---|---|---|
| 5,729,826 A * | 3/1998 | Gavrilovich | H04W 88/08 455/11.1 |
| 2010/0081388 A1 * | 4/2010 | Han | H04W 16/14 455/63.1 |

(Continued)

FOREIGN PATENT DOCUMENTS

| | | |
|---|---|---|
| EP | 2642782 | 9/2013 |
| WO | 2013165163 | 11/2013 |
| WO | 2014007687 | 1/2014 |

OTHER PUBLICATIONS

PCT International Application No. PCT/KR2015/004793, Written Opinion of the International Searching Authority dated Aug. 27, 2015, 22 pages.

*Primary Examiner* — Hsin-Chun Liao
(74) *Attorney, Agent, or Firm* — Lee, Hong, Degerman, Kang & Waimey PC

(57) ABSTRACT

A method for identifying a mobile cell causing interference by a terminal connected to a first mobile cell, according to one embodiment of the present invention, comprises the steps of: acquiring system information of a fixed base station to which the first mobile cell is connected through a backhaul interface; acquiring a physical cell identifier of a second mobile cell neighboring the first mobile cell by a cell search; determining whether the second mobile cell causes interference to the first mobile cell on the basis of the physical cell identifier of the second mobile cell and the system informa- (Continued)

tion of the fixed base station; and reporting the physical cell identifier of the second mobile cell to the first mobile cell if the interference to the first mobile cell is determined to be caused by the second mobile cell.

15 Claims, 11 Drawing Sheets

(51) Int. Cl.
  *H04W 92/20* (2009.01)
  *H04W 84/04* (2009.01)
  *H04W 88/02* (2009.01)

(52) U.S. Cl.
  CPC ..... *H04J 11/0093* (2013.01); *H04W 72/0426* (2013.01); *H04W 84/045* (2013.01); *H04W 88/02* (2013.01); *H04W 92/20* (2013.01)

(56) References Cited

U.S. PATENT DOCUMENTS

| | | | |
|---|---|---|---|
| 2010/0124917 A1* | 5/2010 | Miller, II | H04B 7/024 455/422.1 |
| 2012/0106516 A1 | 5/2012 | Jung et al. | |
| 2013/0303081 A1 | 11/2013 | Chang et al. | |
| 2015/0365884 A1* | 12/2015 | Ljung | H04W 48/16 455/436 |

\* cited by examiner

METHOD FOR IDENTIFYING MOBILE CELL CAUSING INTERFERENCE IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/004793, filed on May 13, 2015, which claims the benefit of U.S. Provisional Application No. 62/034,159, filed on Aug. 7, 2014, the contents of which are all hereby incorporated by reference herein in their entirety.

TECHNICAL FIELD

The present invention relates to a wireless communication system, and more particularly, to a method and apparatus for identifying another moving cell that causes interference to a backhaul link and/or an access link of a moving cell.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA).

Recently, a radio access network structure has been changed to a structure wherein various types of small cells, for example, pico cells or femto cells interact with a macro cell. As a cell structure is multilayered, a data transmission rate and QoE may be improved. In the 3GPP, indoor/outdoor scenarios based on low power nodes to improve small cells have been discussed. This discussion is disclosed in the 3GPP TR 36.932. Also, dual connectivity for a macro cell and the small cells has been discussed. As described above, in the future wireless communication environment, as many small cells are used, it is expected that a user equipment and cells will be located physically closer.

DISCLOSURE

Technical Problem

The present invention is directed to a method and apparatus for efficiently identifying other moving cells that cause interference to a moving cell.

The technical problems solved by the present invention are not limited to the above technical problems and those skilled in the art may understand other technical problems from the following description.

Technical Solution

According to an aspect of the present invention, a method of identifying a moving cell causing interference, by a user equipment (UE) connected to a first moving cell, comprises acquiring system information of a fixed cell to which the first moving cell is connected through a backhaul interface; obtaining, through a cell search, a physical cell identifier of a second moving cell neighboring to the first moving cell; determining whether the second moving cell causes interference to the first moving cell based on the system information of the fixed cell and the physical cell identifier of the second moving cell; and reporting the physical cell identifier of the second moving cell to the first moving cell, when determined that the second moving cell causes interference to the first moving cell.

According to an another aspect of the present invention, a user equipment (UE) connected to a first moving cell, comprises a receiver to acquire system information of a fixed cell to which the first moving cell is connected through a backhaul interface, and to obtain, through a cell search, a physical cell identifier of a second moving cell neighboring to the first moving cell; a processor to determine whether the second moving cell causes interference to the first moving cell based on the system information of the fixed cell and the physical cell identifier of the second moving cell; and a transmitter to report the physical cell identifier of the second moving cell to the first moving cell, when determined that the second moving cell causes interference to the first moving cell.

The UE may determine that the second moving cell causes interference to the first moving cell, when the physical cell identifier of the second moving cell has been included in the system information of the fixed cell.

The UE may receive, from the fixed cell, the system information which is broadcast by the fixed cell or receive the system information via the first moving cell.

The system information of the fixed cell may include information on moving cells being connected to the fixed cell. The system information of the fixed cell may include physical cell identifiers of the moving cells, access link carrier frequency information of the moving cells, and backhaul link carrier frequency information of the moving cells. The system information of the fixed cell may be updated when one of the moving cells releases a connection to the fixed cell or a new moving cell connects to the fixed cell. The UE may acquire the system information of the fixed cell according to an update of the system information of the fixed cell or according to a predetermined periodicity.

The system information of the fixed cell mat be generated based on at least one of E-UTRA Absolute Radio Frequency Channel Number (EARFCN) information of moving cells which is obtained by the fixed cell while the fixed cell is configuring a wireless X2 interface with the moving cells, bandwidth information, and uplink and downlink subframe configuration information.

The interference measurement for the second moving cell may be performed only if determined that the second moving cell causes interference to the first moving cell.

A moving cell synchronization signal indicating the physical cell identifier of the second moving cell may be mapped on a frequency region or a time region different from that of a legacy synchronization signal indicating a physical cell identifier of the fixed cell, or may be generated based on a sequence different from that of the legacy synchronization signal. The UE may be capable of identifying both of the moving cell synchronization signal and the legacy synchronization signal, and the first moving cell may be capable of identifying the legacy synchronization signal only among the moving cell synchronization signal and the legacy synchronization signal.

The physical cell identifier of the second moving cell may be discarded when determined that the second moving cell does not cause interference to the first moving cell.

The interference to the first moving cell caused by the second moving cell may corresponds to interference caused when the second moving cell performs downlink transmission through an access link while the first moving cell is receiving downlink transmission of the fixed cell through a backhaul link, or interference caused when the second moving cell performs uplink transmission through a backhaul link while the first moving cell is receiving uplink transmission of the UE through an access link.

A resource may be additionally allocated to the second moving cell for avoiding interference to the first moving cell, when determined that the second moving cell causes interference to the first moving cell.

Advantageous Effects

According to an embodiment of the present invention, even in an environment where a moving cell cannot identify a physical cell identifier of another moving cell, moving cells causing interference can be efficiently identified, and the overhead of interference measurement can be minimized as the number of moving cells to be measured is reduced.

The effects of the present invention are not limited to the above-described effects and other effects which are not described herein will become apparent to those skilled in the art from the following description.

MODE FOR INVENTION

Figure 1:
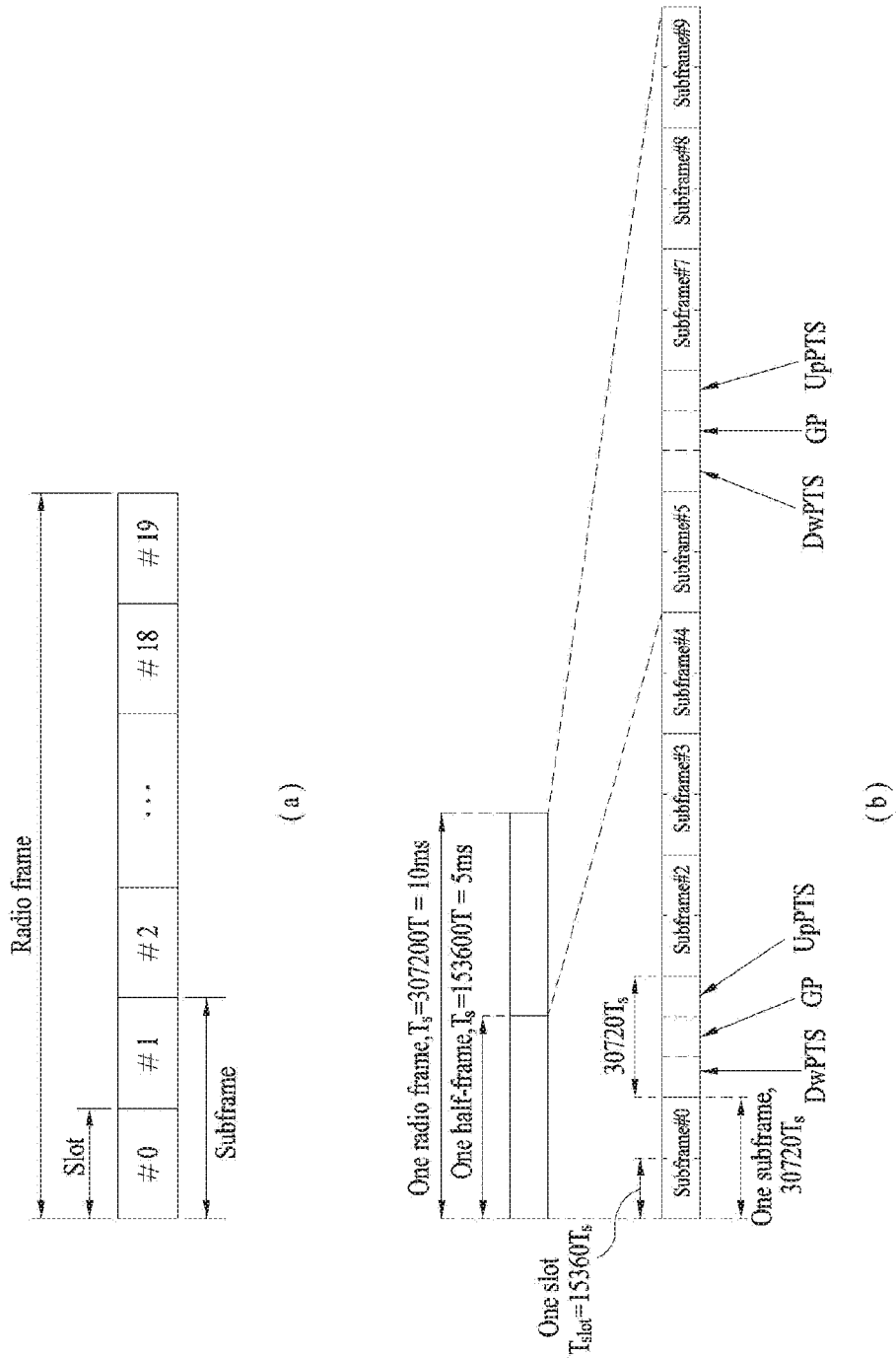
FIG. 1 illustrates a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used in the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a radio frame structure of 3GPP LTE with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

In a case where a normal CP is used, a slot includes 7 OFDM symbols and 1 subframe includes 15 OFDM symbols. Here, the first 2 or 3 OFDM symbols of each subframe can be allocated to PDCCH (physical downlink control channel), and the other OFDM symbols can be allocated to PDSCH (physical downlink shared channel).

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between UL and DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 2:
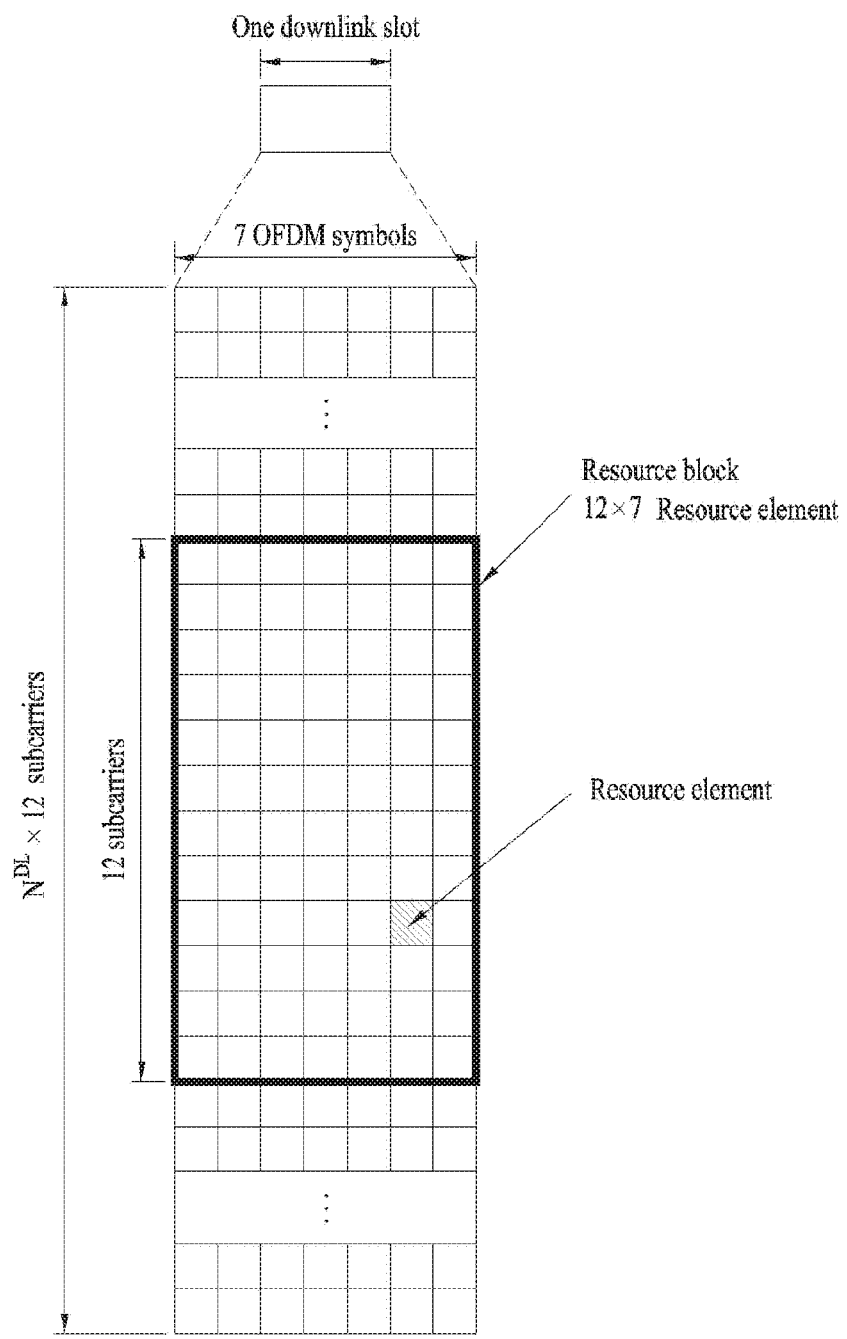
FIG. 2 illustrates a resource grid in a downlink slot.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 3:
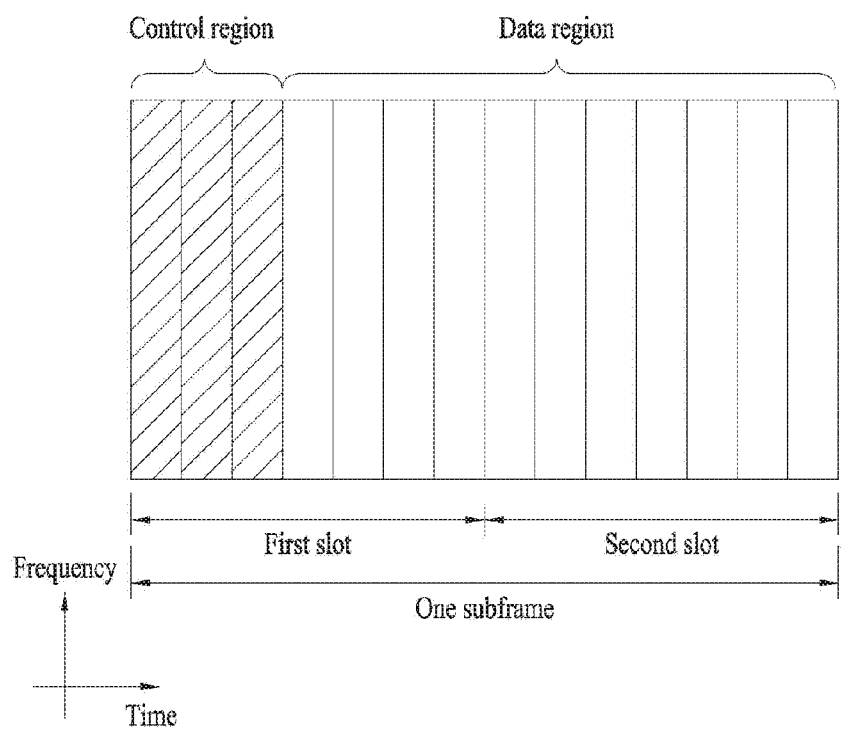
FIG. 3 illustrates a structure of a downlink subframe.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response to uplink transmission and carries HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of voice over IP (VoIP), etc. A plurality of PDCCHs can be transmitted within a control region. The UE can monitor the plurality of PDCCHs. The PDCCH is transmitted on an aggregate of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
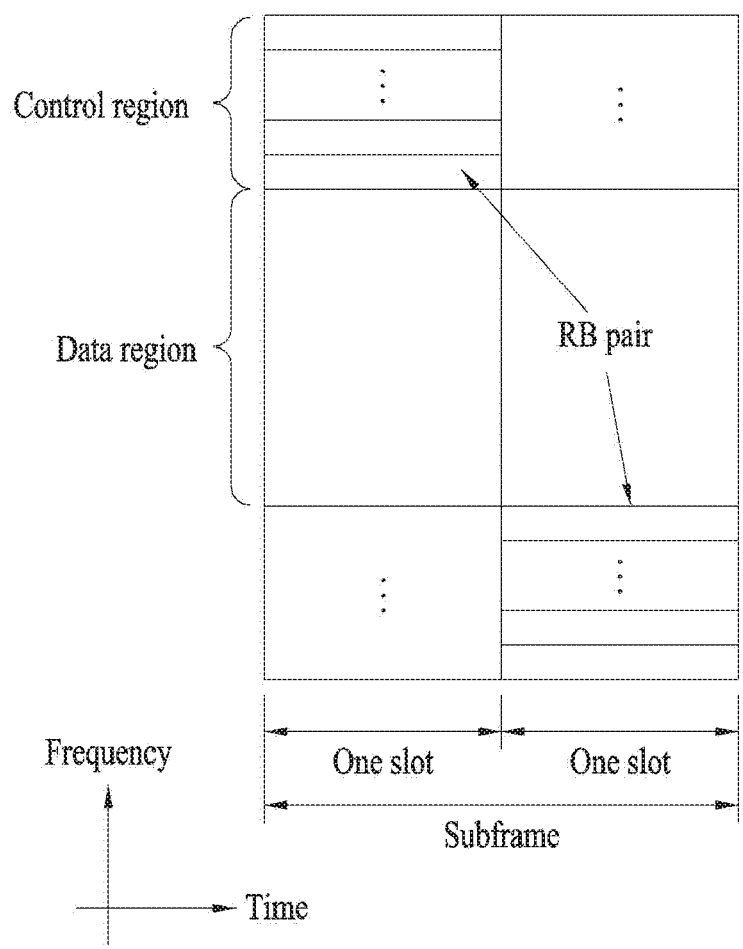
FIG. 4 illustrates a structure of an uplink subframe.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

PSS (Primary Synchronous Signal)/SSS (Secondary Synchronous Signal)

Figure 5:
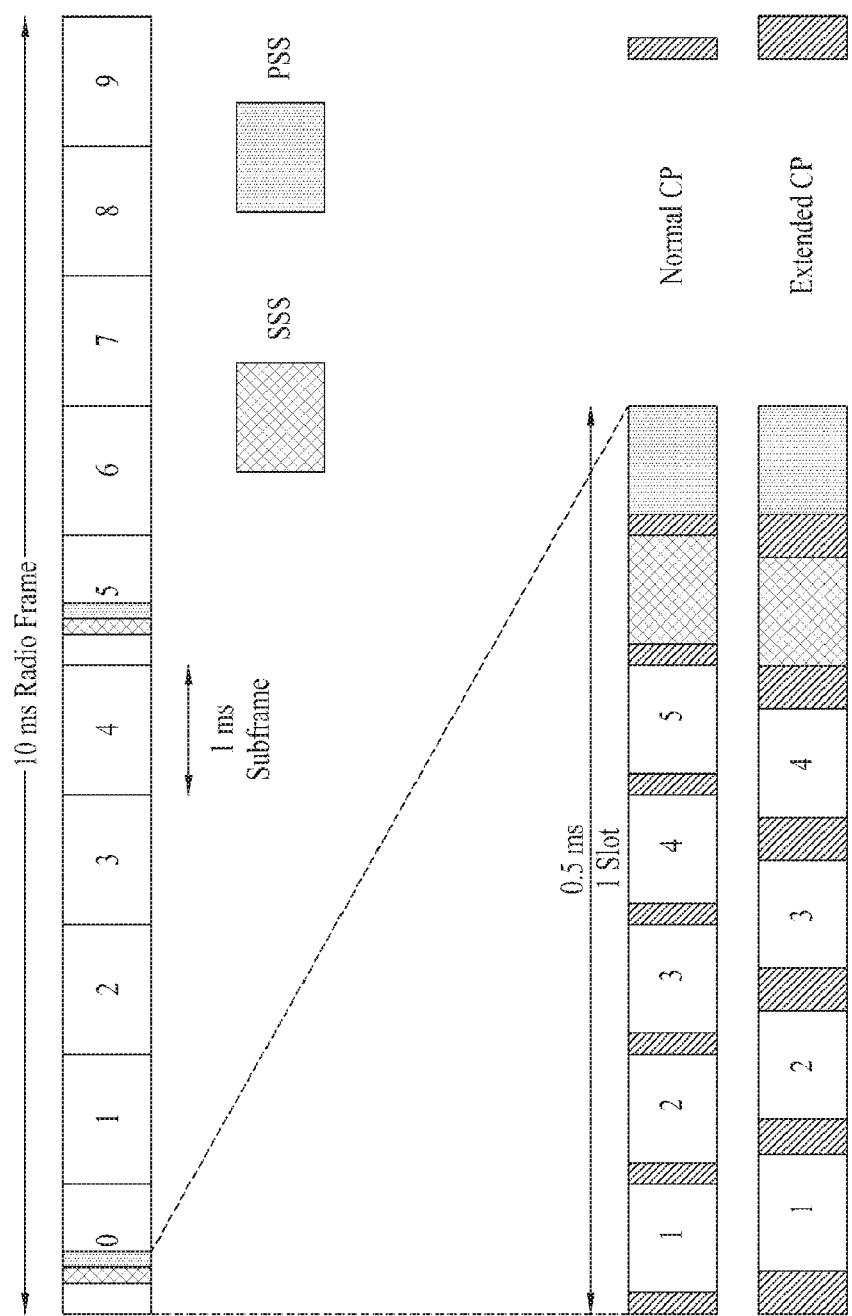
FIG. 5 illustrates a PSS/SSS in an FDD system.

FIG. 5 is a diagram illustrating a PSS and an SSS, which are synchronous signals used for cell search in an LTE/LTE-A system. Cell search will be described prior to description of the PSS and the SSS. When the user equipment is initially connected to a cell, cell search is performed if the user equipment performs handover from a cell, to which the user equipment is currently connected, to another cell, or is performed for cell reselection. Cell search may be performed by frequency and symbol synchronous acquisition of the cell, downlink frame synchronous acquisition of the cell, and determination of cell identifier (ID). Three cell IDs may constitute one cell group, and 168 cell groups may exist.

For cell search, a base station transmits the PSS and the SSS. The user equipment may acquire 5 ms timing of the cell by detecting the PSS and identify cell ID within the cell group. In addition, the user equipment may identify radio frame timing and cell group by detecting the SSS.

Referring to FIG. 5, the PSS is transmitted from subframes 0 and 5. In more detail, the PSS is transmitted from the last OFDM symbol of the first slot at subframes 0 and 5. In addition, the SSS is transmitted from the last second OFDM symbol of the first slot of subframes 0 and 5. That is, the SSS is transmitted from the OFDM symbol just before the PSS is transmitted. This transmission timing corresponds to FDD (Frequency Division Duplex). In case of TDD (Time Division Duplex), the PSS is transmitted from the third symbol of subframes 1 and 6 that is, DwPTS, and the SSS is transmitted from the last symbol of subframes 0 and 5. That is, in TDD, the SSS is transmitted as much as three symbols prior to the PSS.

The PSS is a Zadoff-Chu sequence of length 63, and in real transmission, 0 is padded at both ends of the sequence, whereby the sequence is transmitted on 73 subcarriers (72 subcarriers except DC subcarrier, that is, 6 RBs) in the middle of a system frequency bandwidth. The SSS is a sequence of length 62, which is obtained as two sequences of length 31 are frequency-interleaved, and is transmitted on 72 subcarriers in the middle of a full system bandwidth in the same manner as the PSS.

PBCH (Physical Broadcast Channel)

Figure 6:
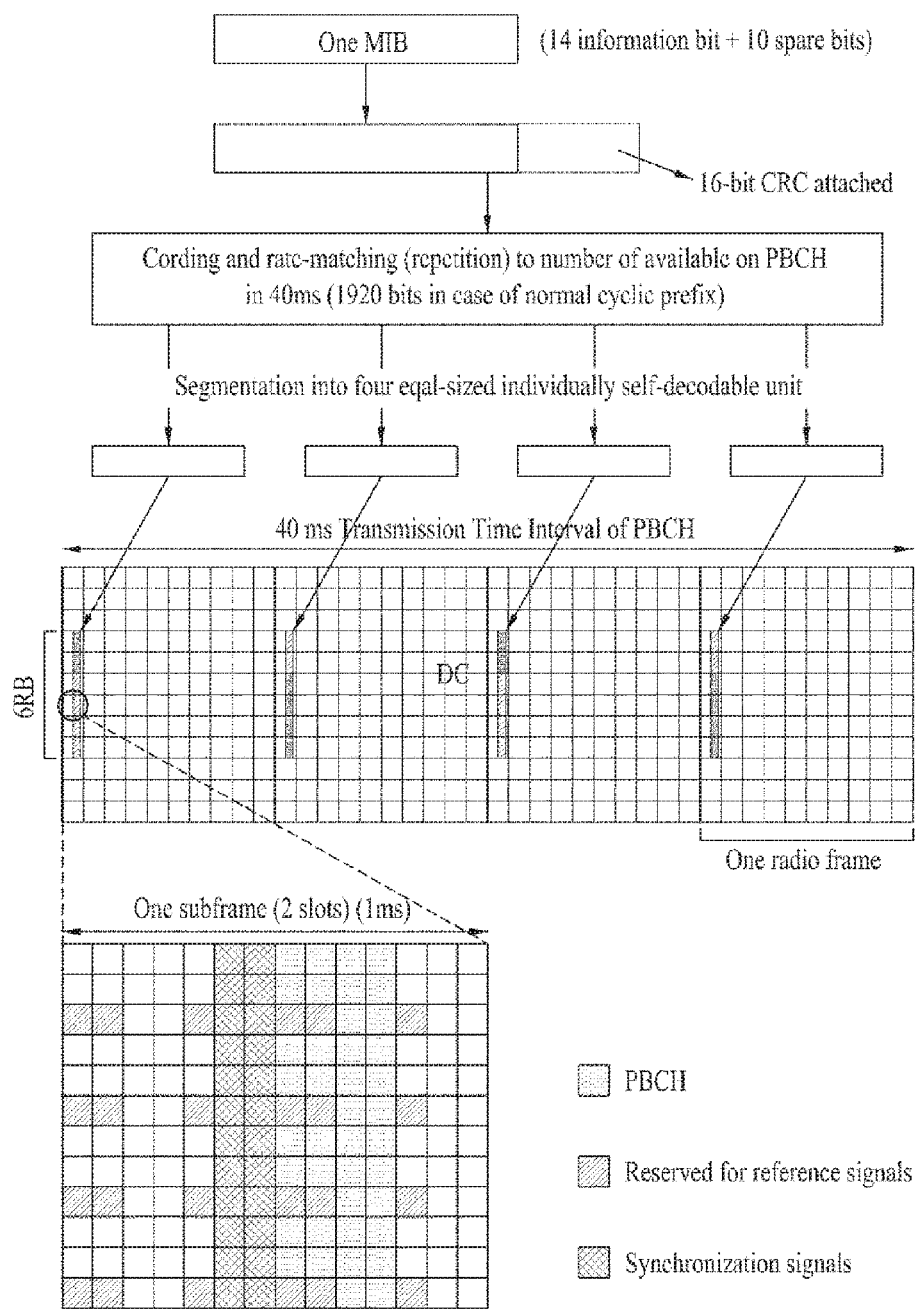
FIG. 6 illustrates a PBCH.

FIG. 6 is a diagram illustrating a physical broadcast channel (PBCH). The PBCH is the channel to which system information corresponding to a master information block (MIB) is transmitted, and is used to allow the user equipment to obtain system information after acquiring downlink synchronization and cell ID through the aforementioned PSS/SSS. In this case, the MIB may include downlink cell bandwidth information, PHICH configuration information, subframe number (SFN), etc.

One MIB, as shown in FIG. 6, is transmitted through a first subframe of each of four continuous radio frames. In more detail, the PBCH is transmitted from first four OFDM symbols of the second slot of the subframe 0 at four continuous radio frames. Accordingly, the PBCH for transmitting one MIB is transmitted at a period of 40 ms. The PBCH is transmitted on 72 subcarriers in the middle of the full bandwidth on a frequency axis, which corresponds to the smallest downlink bandwidth, 6 RBs. This serves to allow the user equipment to decode BCH without problem even though the user equipment does not know the size of the full system bandwidth.

Moving Cell

A moving cell may be considered as a small cell in a hierarchical cell structure of a macro cell and a small cell. For example, the moving cell may be a small base station mounted on a physically moving device (e.g., a bus or a train, or a transportation means such as a smart car). On the other hand, a macro cell can be a fixed cell as it is.

Since the fixed cell (or the macro cell) and the moving cell construct a hierarchical cell structure, the moving cell can be seen as UE in view of the macro cell. However, the moving cell must be able to transmit and receive a large amount of aggregated traffic by a plurality of UEs unlike a existing UE. Accordingly, a wireless backhaul link is established between the moving cell and the fixed cell for supporting massive aggregated traffic.

Meanwhile, since the moving cell is serving the UEs, the moving cell is regarded as a serving cell rather than another UE. The moving cell provides group mobility to the UEs that it serves through physical movement and handover. In-band communication within the moving cell can support full duplex.

As shown in Table 1, various types of moving cells can be considered, and each characteristic according to the type of moving cell should be considered.

TABLE 1

| Category | Backhaul Distance | Mobility | Moving Pattern | Access Link User Load |
| --- | --- | --- | --- | --- |
| Public Transportation | Long | Wide speed range | Fixed | Medium/High |
| Smart Car | Medium/Short | Wide speed range | Arbitrary | Low/Medium |
| Personal Cell | Various | Low speed range | Arbitrary | Low/Medium |

Figure 7:
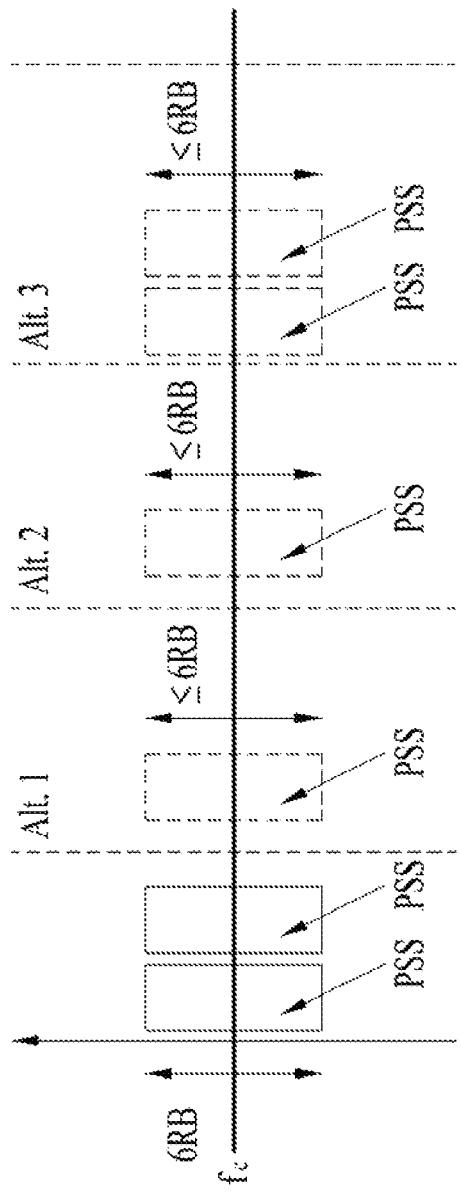
FIG. 7 is a diagram for explaining transmission of a synchronization signal for a moving cell and a legacy synchronization signal in different frequency regions according an embodiment of the present invention.

FIG. 7 is a diagram for explaining transmission of a synchronization signal for a moving cell and a legacy synchronization signal in different frequency regions according an embodiment of the present invention.

As shown in the leftmost side of FIG. 7, a synchronization signal in the LTE/LTE-A system is configured with a primary synchronization signal (PSS) and a secondary synchronization signal (SSS). The synchronization signal is mapped to a region with the length of 6 RBs (resource blocks) with a DC component as the center and then transmitted through a carrier frequency (fc). According to the embodiment of the present invention, to transmit the synchronization signal for the moving cell and the synchronization signal for the legacy user equipment in the different frequency regions based on the above explanation, (1) only a PSS configured for the moving cell may be transmitted in a frequency region with a length equal to or less than 6 RBs (Alt. 1 in FIG. 7), (2) only an SSS configured for the moving cell may be transmitted in the frequency region with the length equal to or less than 6 RBs (Alt. 2 in FIG. 7), or (3) both of the PSS and the SSS configured for the moving cell may be transmitted in the frequency region with the length equal to or less than 6 RBs (Alt. 3 in FIG. 7).

Although it is assumed in FIG. 7 that the synchronization signal for the moving cell is also transmitted at a location symmetrical with respect to the carrier frequency (fc), the present invention is not limited thereto.

Figure 8:
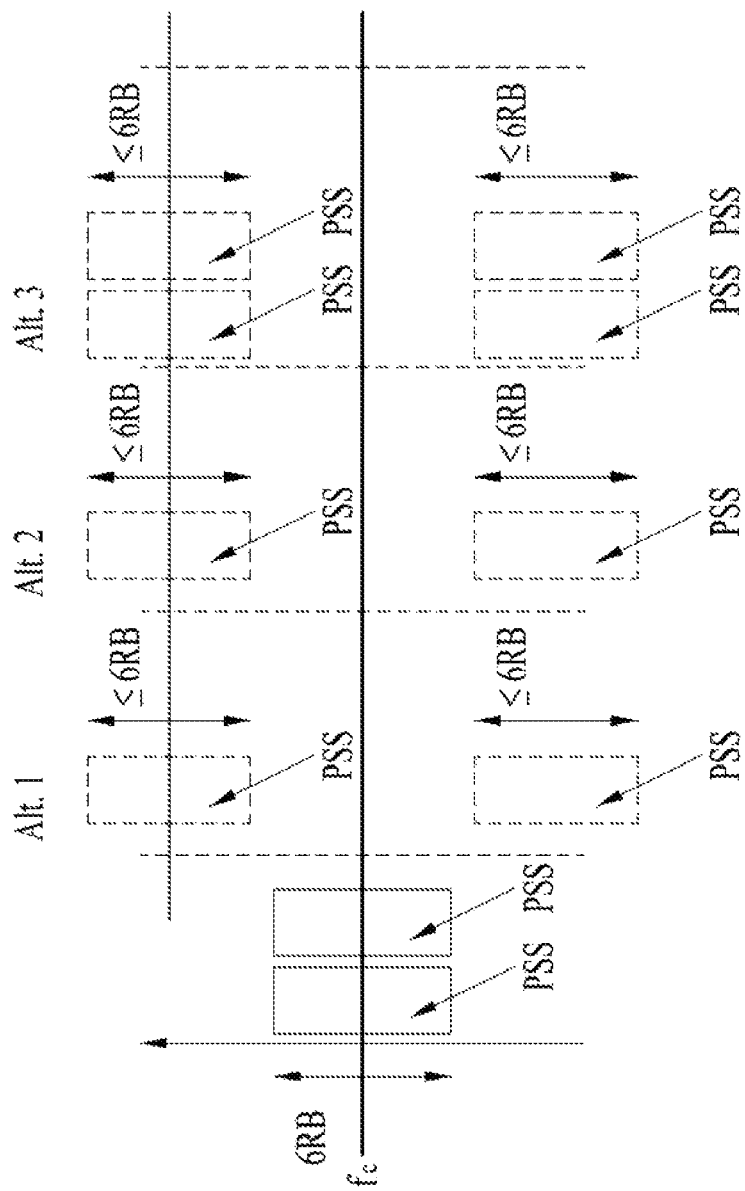
FIG. 8 is a diagram for explaining transmission of a synchronization signal for a moving cell and a legacy synchronization signal in different frequency regions according another embodiment of the present invention.

FIG. 8 is a diagram for explaining transmission of a synchronization signal for a moving cell and a legacy synchronization signal in different frequency regions according another embodiment of the present invention.

Specifically, the embodiment of FIG. 8 illustrates an example of transmitting the synchronization signal for the moving cell after mapping the synchronization signal to locations that are n apart from the carrier frequency in the positive (+) direction and/or in the negative (−) direction. Here, although a value of n is not specifically limited, it may be selected from a range of '−(system bandwidth/2)≤n≤(system bandwidth2)'.

In the example of FIG. 8, each synchronization signal sequence for the moving cell may also be mapped to a frequency region with a length equal to or less than 6 RBs and then transmitted. In addition, regarding the synchronization signal for the moving cell, (1) only a PSS configured for the moving cell may be transmitted at a location±n away from the carrier frequency in the frequency region with the length equal to or less than 6 RBs (Alt. 1 in FIG. 8), (2) only an SSS configured for the moving cell may be transmitted at the location±n away from the carrier frequency in the frequency region with the length equal to or less than 6 RBs (Alt. 2 in FIG. 8), or (3) both of the PSS and the SSS configured for the moving cell may be transmitted at locations ±n away from the carrier frequency in the frequency region with the length equal to or less than 6 RBs (Alt. 3 in FIG. 8).

The synchronization signals for the moving cell transmitted according to FIGS. 7 and 8 may correspond to an additionally transmitted signal other than the synchronization signal of the legacy system. Although the additionally transmitted signal may be the PSS, SSS or combination thereof as shown in FIGS. 7 and 8, a new sequence defined for the moving cell may be used.

If the above-described synchronization signal sequence for the moving cell corresponds to the PSS, SSS or combination thereof, instead of or in addition to using the frequency region different from that used in the legacy system, a sequence different from that in the legacy system may be used as follows.

In consideration of a moving cell to be accommodated in a 5G wireless communication environment, if a user of a UE gets on a bus, a train, or a vehicle, the UE recognizes a moving cell of the bus, the train, or the vehicle as a serving cell thereof. The UE may exchange a DL/UL control signal or DL/UL data through the moving cell. Such an environment is different from small cell based communication of a fixed type that has considered up to a legacy 4G wireless communication environment. On a bus, a train, or a vehicle, since a plurality of UEs should be simultaneously serviced, it is expected that reliability or latency of a communication service will be a more important issue. In other words, the moving cell should provide a high quality service to users so as to be transparent to environment variation according to mobility thereof. To this end, the moving cell needs to discern the presence of other moving cells that can disappear after instantaneously appearing therearound and control interference caused by the other moving cells.

Figure 9:
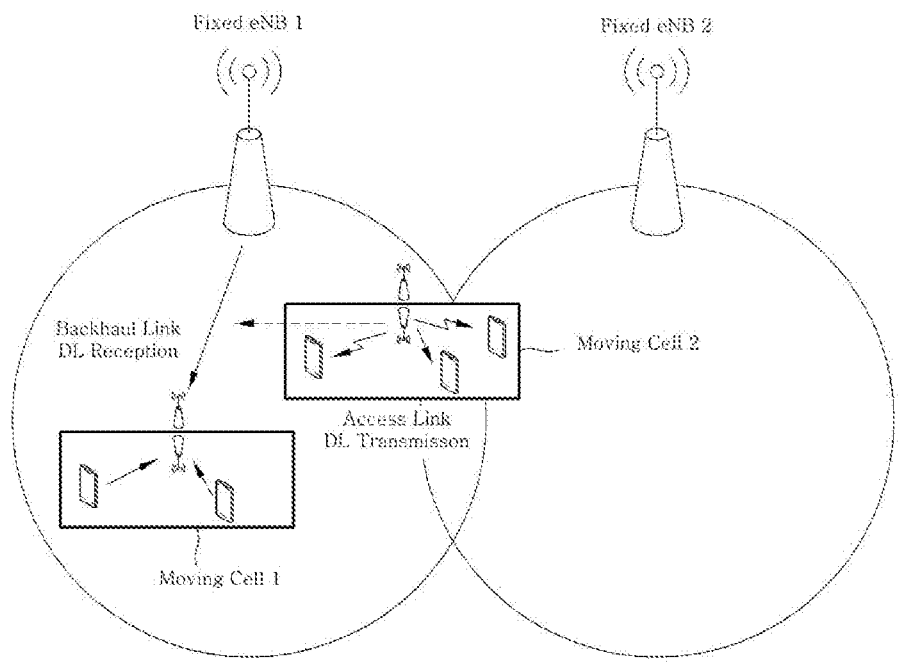
FIG. 9 and FIG. 10 illustrate interference between moving cells in a wireless communication environment according to an embodiment of the present invention.
Figure 10:
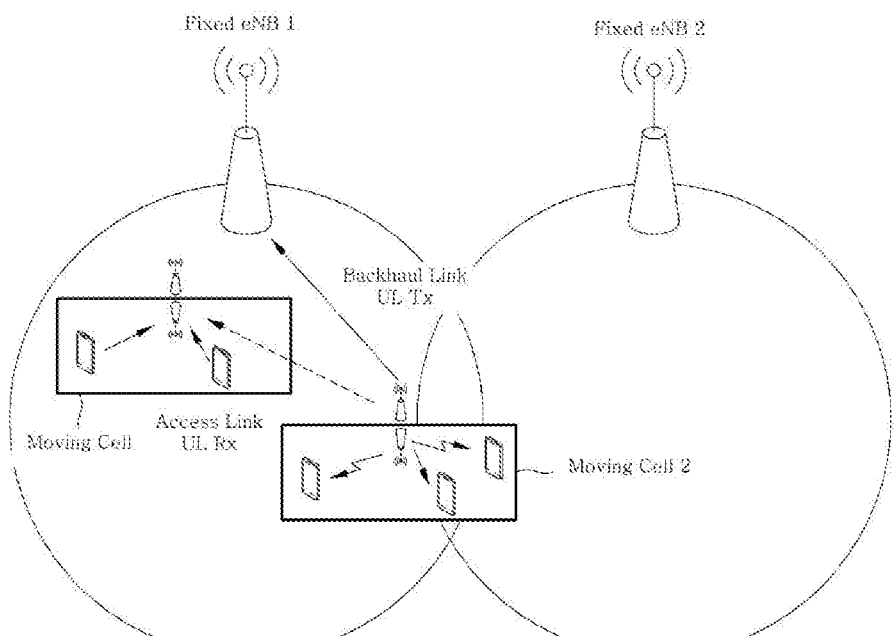

FIGS. 9 and 10 illustrate an interference scenario of moving cells according to an embodiment of the present invention.

FIG. 9 illustrates a scenario in which access link DL transmission of a second moving cell causes interference with respect to backhaul link DL reception of a first moving cell. FIG. 10 illustrates a scenario in which backhaul link UL transmission of the second moving cell causes interference with respect to access link UL reception of the first moving cell.

In this way, since moving cells that pass a specific moving cell cause interference with respect to the specific moving cell, it is necessary to control such interference. If a backhaul interface of a moving cell is configured to detect only a specific PSS (e.g., legacy PSS), the backhaul interface of the moving cell cannot detect a PSS which is newly designed for an access interface of a neighbor moving cell. The newly designed PS serves to block access to a neighbor moving cell. Accordingly, a method for enabling a specific moving cell to identify interference causing moving cells appearing around the specific moving cell is needed.

Hereinafter, embodiments in which a moving cell identifies neighbor moving cells that cause interference while passing thereby in a wireless communication environment are proposed. A situation in which moving cells operate when a physical layer cell ID (PCID) based on the above-described new PSS is applied is assumed. In addition, a situation in which both access-to-backhaul link interference and backhaul-to-access link interference use the same carrier is assumed.

In a situation in which the technology of the present invention is applied based on an LTE/LTE-A system, as an embodiment of the present invention, a fixed eNB may broadcast system information (e.g., SIB) about all moving cells in coverage thereof. Information that the SIB should include may be, for example, a PCID of a moving cell and frequency of an access/backhaul link of the moving cell.

Table 2 illustrates a SIB 9 (System Information Block Type 9 information element) including information on a Home eNB among SIB messages described in the existing LTE/LTE-A.

TABLE 2

```
SystemInformationBlockType9 ::=  SEQUENCE {
  hnb-Name                                OCTET STRING (SIZE(1..48))
    OPTIONAL,           -- Need OR
  ...,
  lateNonCriticalExtension                OCTET STRING
    OPTIONAL}
```

According to an embodiment of the present invention, for example, SIB 10 (System Information BlockType 10 information element) can be defined as a new SIB. The SIB 10 contains information for the moving cell. Table 3 illustrates SIB 10 according to one embodiment of the present invention.

TABLE 3

```
SystemInformationBlockType10 ::=   SEQUENCE {
   NeighMovingCellList                  NeighMOvingCellList      OPTIONAL,
     -- Need OR
   ...,
   lateNonCriticalExtension             OCTET STRING
     OPTIONAL
}
NeighMovingCellList        ::=    SEQUENCE (SIZE (1..maxMovingCell)) OF NeighMovingCellInfo
```

TABLE 3-continued

```
NeighMovingCellInfo ::=    SEQUENCE {
    physCellId                         PhysCellId,
    BLcarrierFreq                      ARFCN-ValueUTRA
    ALcarrierFreq                      ARFCN-ValueUTRA
    ...
}
```

SIB 10 is information that a fixed eNB broadcasts. The fixed eNB updates SIB 10 whenever a new cell enters coverage thereof or leaves coverage thereof and provides updated SIB 10 to UEs present in coverage thereof. The fixed eNB includes information acquired from a moving cell in SIB 10 in a process of configuring a wireless connection based X2 interface with the moving cell.

For example, in an FDD system, a UL/DL EARFCN (E-UTRA Absolute Radio Frequency Channel Number) and a UL/DL transmission bandwidth may be included in SIB10. In a TDD system, the EARFCN, the transmission bandwidth, and a UL/DL subframe configuration may be included in SIB 10.

Figure 11:
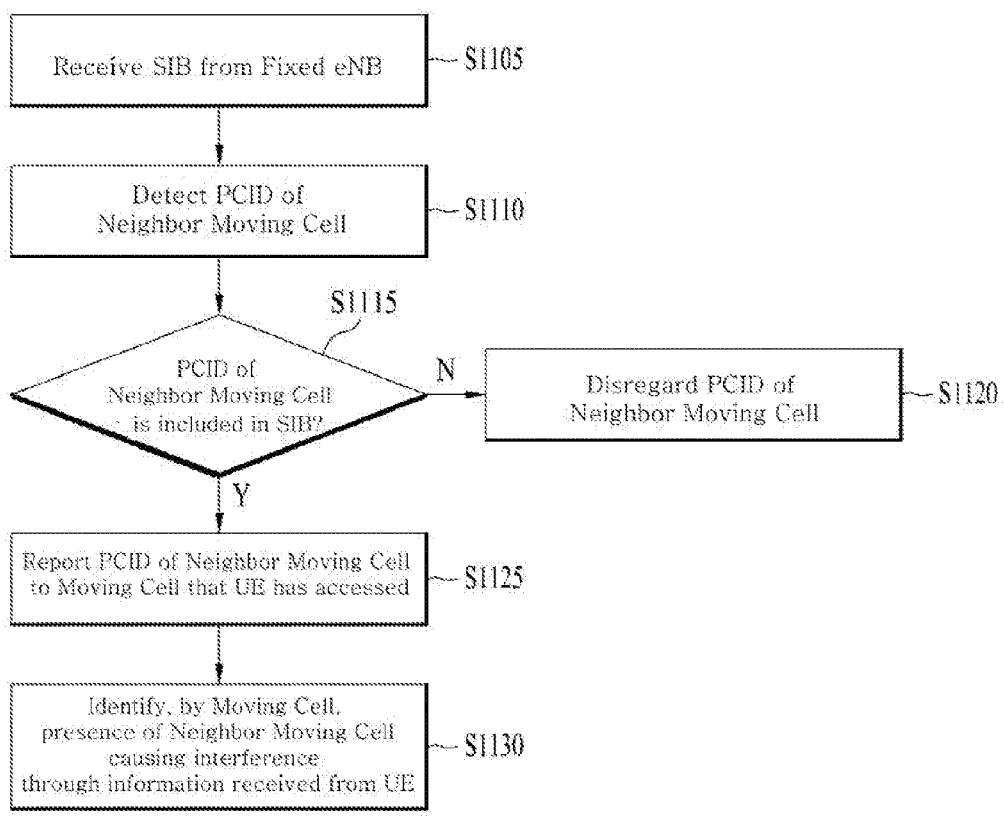
FIG. 11 is a flowchart illustrating a method of identifying a moving cell that causes interference according to an embodiment of the present invention.

FIG. 11 illustrates a method in which a moving cell identifies neighbor moving cells according to an embodiment of the present invention.

In this embodiment, a UE entering a moving cell may receive information about moving cells present within a fixed eNB from the fixed eNB and identify moving cells approaching the moving cell to which the UE belongs. For example, the UE may sense PCIDs of neighbor moving cells that pass the moving cell to which the UE belongs, based on information of SIB 10 received from the fixed eNB.

Meanwhile, a backhaul interface of a moving cell cannot detect PCIDs on an access link of other moving cells, as described above. Therefore, in this embodiment, the UE may identify other moving cells so that the UE may inform a moving cell that the UE has accessed of presence of other moving cells causing interference.

Referring to FIG. 11, a UE that has accessed a first moving cell receives, through an SIB, information about other moving cells present in coverage of a fixed eNB that the first moving cell has accessed (S1105). The UE may periodically receive the SIB including the information about other moving cells or may receive the SIB whenever the information about moving cells present in coverage of the fixed eNB is changed.

The UE collects PCIDs of other moving cells located around the first moving cell by performing cell search in order to identify moving cells that actually cause interference around the first moving cell (S1110).

The UE determines whether the PCIDs of the moving cells, collected through cell search, are included in the SIB received from the fixed eNB (S1115).

If the PCIDs of the moving cells, corrected through cell search, are not included in the SIB, the UE disregards the PCIDs without informing the first moving cell that the UE has accessed (S1120).

If the PCIDs of the moving cells, corrected through cell search, are included in the SIB, the UE regards the moving cells having the PCIDs as moving cells causing interference and reports the moving cells causing interference to the first moving cell that the UE has accessed (S1125).

The first moving cell identifies presence of the moving cells causing interference that pass the first moving cell, through information received from the UE that has accessed the first moving cell (S1130). Meanwhile, upon identifying presence of the moving cells causing interference, the first moving cell may schedule the UE by avoiding interference from the moving cells causing interference. The first moving cell may acquire information about the moving cells causing interference from a fixed eNB.

In this way, the first moving cell may identify moving cells actually causing interference with UEs thereof. For example, numerous moving cells (e.g., 30 to 40 moving cells) may be present at a specific timing in the same place (e.g., within a radius 100 m), the first moving cell recognizes only some moving cells (e.g., two or three moving cells) of which UEs connected to the first moving cells inform the first moving cell as the moving cells causing interference. Accordingly, the range of the moving cells causing interference that are to perform interference measurement can be effectively reduced and overhead of interference measurement can be reduced.

Hereinafter, a method in which the first moving cell that has identified the moving cells causing interference avoids interference will be described. The first moving cell will be referred to as a victim moving cell and the moving cells causing interference will be referred to as aggressor moving cells.

First, the case in which an access link of the aggressor moving cells causes interference with respect to a backhaul link of the victim moving cell will now be described. The victim moving cell that has received reporting on the aggressor moving cells from the UE reports interference to the fixed eNB. Reporting on interference may include reporting strength of interference measured per resource block (RB). The strength of interference may be expressed as a level, for example, high, medium, or low. In this case, the RB may be an RB that the victim moving cell uses for DL reception.

The fixed eNB transmits the strength of interference per RB that the victim moving cell transmits to the aggressor moving cells, based on reporting on interference received from the victim moving cell. If there are many aggressor moving cells around the victim moving cell (e.g. when the number of aggressor moving cells is greater than a preset threshold value), the fixed eNB may additionally allocate RBs in which interference with respect to the victim moving cell can be avoided to the aggressor moving cells. The additionally allocated RBs may be differently set with respect to each aggressor moving cell.

Upon receiving information about the additionally allocated RBs and information about the strength of interference from the fixed eNB, the aggressor moving cells perform DL scheduling on an access link through an RB region different from a region used by the victim moving cell.

Next, the case in which a backhaul link of the aggressor moving cells causes interference with respect to an access link of the victim moving cell will be described. The victim moving cell that has received reporting on the aggressor moving cells from the UE reports interference to the fixed eNB. Reporting on interference may include reporting on strength of interference measured per RB. The strength of interference may be expressed as a level, for example, high, medium, or low. In this case, the victim moving cell may request that the fixed eNB transmit RB information for UL scheduling on a backhaul link of the aggressor moving cells.

The fixed eNB transmits the RB information for UL scheduling on the backhaul link of the aggressor moving cells to the victim moving cell, based on reporting on interference received from the victim moving cell. If there are many aggressor moving cells around the victim moving cell (e.g. when the number of aggressor moving cells is greater than a preset threshold value), the fixed eNB may additionally allocate RBs in which interference received from the aggressor moving cells can be avoided to the victim cell.

Upon receiving information about the additionally allocated RBs from the fixed eNB, the victim moving cell performs UL scheduling on the access link through an RB region different from a region used by the aggressor moving cells.

Meanwhile, information about the aggressor moving cells that the UE identifies and reports may be updated according to mobility of the victim moving cell or the aggressor moving cells. A new PCID or a PCID based on a new synchronization signal is used and, in principle, a moving cell cannot sense PCIDs of other moving cells. However, while the UE reports the information about the aggressor moving cells, the victim moving cell may identify the aggressor moving cells according to reporting by the UE as an exceptional case, measure interference, and perform interference control. For example, if the aggressor moving cells reported by the UE at a specific timing are not reported any longer, the victim moving cell may cancel the information about the aggressor moving cells and stop processes including interference measurement for the aggressor moving cells.

Figure 12:
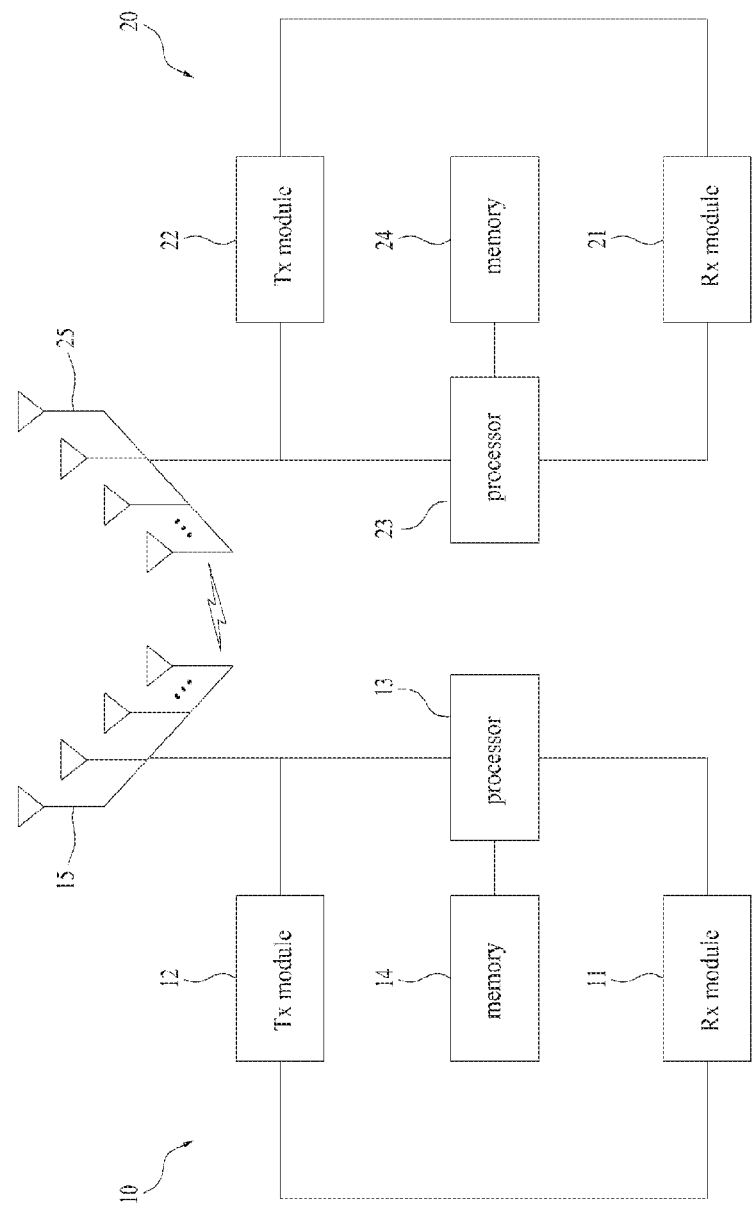
FIG. 12 illustrates a UE and a base station according to an embodiment of the present invention.

FIG. 12 illustrates structures of a UE and an eNB according to an embodiment of the present invention. The eNB may be a fixed cell or a moving cell. The UE and the eNB illustrated in FIG. 12 may perform the aforementioned methods.

The eNB 10 may include a receiver 11, a transmitter 12, a processor 13, a memory 14 and a plurality of antennas 15. The antennas 15 mean that the eNB supports MIMO transmission and reception. The receiver 11 may receive signals, data and information from the UE on uplink. The transmitter 12 may transmit signals, data and information to the UE on downlink. The processor 13 may control the overall operation of the eNB 10.

In addition, the processor 13 of the eNB 10 may process information received thereby and information to be transmitted. The memory 14 may store processed information for a predetermined time and may be replaced by a component such as a buffer (not shown).

The UE 20 may include a receiver 21, a transmitter 22, a processor 23, a memory 24 and a plurality of antennas 25. The antennas 25 mean that the UE supports MIMO transmission and reception. The receiver 21 may receive signals, data and information from the eNB on downlink. The transmitter 22 may transmit signals, data and information to the eNB on uplink. The processor 23 may control the overall operation of the UE 20.

In addition, the processor 23 of the UE 20 may process information received thereby and information to be transmitted. The memory 24 may store processed information for a predetermined time and may be replaced by a component such as a buffer (not shown).

According to an embodiment of the present invention, the UE 20 connects to the first moving cell. The receiver 21 of the UE 20 acquires the system information of the fixed cell connected to the first moving cell through the backhaul interface. The receiver 21 obtains a physical cell identifier of a second moving cell neighboring to the first mobile cell through a cell search. The processor 23 determines whether or not the second mobile cell causes interference to the first mobile cell based on the physical cell identifier of the second moving cell and the system information of the fixed cell. The transmitter 22 reports the physical cell identifier of the second moving cell to the first moving cell if it is determined that the second moving cell causes interference to the first moving cell.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein. Therefore, the present invention is not limited to the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The aforementioned embodiments of the present invention can be applied to various mobile communication systems.

What is claimed is:

1. A method of identifying a moving cell causing interference, by a user equipment (UE) connected to a first moving cell, the method comprising:
    acquiring system information of a fixed cell to which the first moving cell is connected through a backhaul interface;
    obtaining, through a cell search, a physical cell identifier of a second moving cell neighboring to the first moving cell;
    determining whether the second moving cell causes interference to the first moving cell based on the system information of the fixed cell and the physical cell identifier of the second moving cell; and
    reporting the physical cell identifier of the second moving cell to the first moving cell, when determined that the second moving cell causes interference to the first moving cell.

2. The method of claim 1, wherein determining whether the second moving cell causes interference to the first moving cell comprises:
    determining that the second moving cell causes interference to the first moving cell, when the physical cell identifier of the second moving cell has been included in the system information of the fixed cell.

3. The method of claim 1, wherein acquiring the system information of the fixed cell comprises:
    receiving, from the fixed cell, the system information which is broadcast by the fixed cell; or
    receiving the system information via the first moving cell.

4. The method of claim 1, wherein the system information of the fixed cell includes information on moving cells being connected to the fixed cell.

5. The method of claim 4, wherein the system information of the fixed cell includes physical cell identifiers of the moving cells, access link carrier frequency information of the moving cells, and backhaul link carrier frequency information of the moving cells.

6. The method of claim 4, wherein the system information of the fixed cell is updated when one of the moving cells releases a connection to the fixed cell or a new moving cell connects to the fixed cell.

7. The method of claim 6, wherein acquiring the system information of the fixed cell comprises:
    acquiring the system information of the fixed cell according to an update of the system information of the fixed cell or according to a predetermined periodicity.

8. The method of claim 1, wherein the system information of the fixed cell is generated based on at least one of E-UTRA Absolute Radio Frequency Channel Number (EARFCN) information of moving cells which is obtained by the fixed cell while the fixed cell is configuring a wireless X2 interface with the moving cells, bandwidth information, and uplink and downlink subframe configuration information.

9. The method of claim 1, wherein interference measurement for the second moving cell is performed only if determined that the second moving cell causes interference to the first moving cell.

10. The method of claim 1, wherein a moving cell synchronization signal indicating the physical cell identifier of the second moving cell is mapped on a frequency region or a time region different from that of a legacy synchronization signal indicating a physical cell identifier of the fixed cell, or is generated based on a sequence different from that of the legacy synchronization signal.

11. The method of claim 10,
    wherein the UE is capable of identifying both of the moving cell synchronization signal and the legacy synchronization signal, and
    wherein the first moving cell is capable of identifying the legacy synchronization signal only among the moving cell synchronization signal and the legacy synchronization signal.

12. The method of claim 1, wherein the physical cell identifier of the second moving cell is discarded when determined that the second moving cell does not cause interference to the first moving cell.

13. The method of claim 1, wherein interference to the first moving cell caused by the second moving cell corresponds to:
    interference caused when the second moving cell performs downlink transmission through an access link while the first moving cell is receiving downlink transmission of the fixed cell through a backhaul link, or
    interference caused when the second moving cell performs uplink transmission through a backhaul link while the first moving cell is receiving uplink transmission of the UE through an access link.

14. The method of claim 1, wherein a resource is additionally allocated to the second moving cell for avoiding interference to the first moving cell, when determined that the second moving cell causes interference to the first moving cell.

15. A user equipment (UE) connected to a first moving cell, comprising:
    a receiver to acquire system information of a fixed cell to which the first moving cell is connected through a backhaul interface, and to obtain, through a cell search, a physical cell identifier of a second moving cell neighboring to the first moving cell;
    a processor to determine whether the second moving cell causes interference to the first moving cell based on the system information of the fixed cell and the physical cell identifier of the second moving cell; and
    a transmitter to report the physical cell identifier of the second moving cell to the first moving cell, when determined that the second moving cell causes interference to the first moving cell.

* * * * *